(12) United States Patent
Fitzsimons

(10) Patent No.: US 8,371,659 B2
(45) Date of Patent: Feb. 12, 2013

(54) SPOKED WHEEL

(75) Inventor: Duncan Fitzsimons, London (GB)

(73) Assignee: Royal College of Art, London (GB)

(*) Notice: Subject to any disclaimer, the term of this patent is extended or adjusted under 35 U.S.C. 154(b) by 439 days.

(21) Appl. No.: 12/664,324

(22) PCT Filed: Jun. 12, 2008

(86) PCT No.: PCT/GB2008/002015
§ 371 (c)(1),
(2), (4) Date: Apr. 12, 2010

(87) PCT Pub. No.: WO2008/152391
PCT Pub. Date: Dec. 18, 2008

(65) Prior Publication Data
US 2010/0201098 A1    Aug. 12, 2010

(30) Foreign Application Priority Data

Jun. 13, 2007 (EP) .................................. 07252385

(51) Int. Cl.
*B60B 25/02* (2006.01)
*B60B 19/04* (2006.01)
(52) U.S. Cl. ............ 301/5.1; 301/29.2; 301/32; 301/58; 152/277
(58) Field of Classification Search .................... 301/5.1, 301/29.2, 31, 32, 35.1, 57, 58, 60, 67; 152/377
See application file for complete search history.

(56) References Cited

U.S. PATENT DOCUMENTS

| 1,163,257 | A | * | 12/1915 | Ottenad ........................ 301/32 |
|-----------|---|---|---------|---------------------------------------|
| 1,308,660 | A |   | 7/1919  | Clark                                 |
| 1,359,827 | A |   | 11/1920 | Ne Ville                              |
| 1,439,943 | A |   | 12/1922 | Castle                                |
| 1,476,916 | A |   | 12/1923 | Parker                                |
| 1,513,333 | A |   | 10/1924 | McLean                                |

(Continued)

FOREIGN PATENT DOCUMENTS

| CA | 197456 | 2/1920 |
|----|--------|--------|
| CA | 199794 | 5/1920 |

(Continued)

OTHER PUBLICATIONS

International Search Report for parent application PCT/GB2008/002015, having a mailing date of Sep. 12, 2008.

(Continued)

*Primary Examiner* — Kip T Kotter
(74) *Attorney, Agent, or Firm* — Lowenstein Sandler LLP

(57) ABSTRACT

The present invention provides a spoked wheel including a rim having a continuous series of circumferential sections each of which has opposed ends and is connected at each of its ends to an adjacent section by means of a hinge that allows the two adjacent sections to pivot with respect to each other substantially in the plane of the wheel. The wheel also includes a hub that rotates with the rim and a plurality of spokes extending between the hub and the rim and supporting the rim on the hub. Each of the spokes having an end that is pivotally attached to the rim. At least one of the spokes is movable with respect to the hub in the plane of the wheel to change the angular spacing between adjacent spokes and alter the shape of the rim between a circular shape and a non-circular shape.

14 Claims, 13 Drawing Sheets

U.S. PATENT DOCUMENTS

| | | | |
|---|---|---|---|
| 2,122,955 | A | 7/1938 | Rush |
| 2,180,471 | A | 11/1939 | Johnson |
| 3,179,431 | A * | 4/1965 | Pikl ................... 280/5.2 |
| 3,348,352 | A | 10/1967 | Cummings |
| 3,552,747 | A | 1/1971 | Deem |
| 4,056,285 | A | 11/1977 | Wright |
| 4,465,321 | A | 8/1984 | Berg |
| 4,602,823 | A | 7/1986 | Berg |
| 5,205,573 | A * | 4/1993 | Mhedhbi ................ 280/287 |
| 6,028,570 | A | 2/2000 | Gilger et al. |
| 6,364,424 | B1 * | 4/2002 | Lashlee et al. ........ 301/64.307 |
| 7,717,447 | B2 | 5/2010 | Orford |
| 2011/0080038 | A1 | 4/2011 | Tan |

FOREIGN PATENT DOCUMENTS

| | | |
|---|---|---|
| CA | 2263058 | 8/2000 |
| CA | 2271600 | 8/2000 |
| CN | 2830123 | 10/2006 |
| DE | 3921333 | 1/1991 |
| FR | 2 795 947 A1 | 1/2001 |
| FR | 2795947 | 1/2001 |
| FR | 2 829 968 A1 | 3/2003 |
| FR | 2829968 | 3/2003 |
| GB | 10204 | 11/1916 |
| GB | 573 956 A | 12/1945 |
| GB | 573956 | 12/1945 |
| JP | 2005212675 | 8/2005 |
| NZ | 531830 | 3/2004 |
| TW | 1275500 | 3/2004 |

OTHER PUBLICATIONS

International Preliminary Report for parent application PCT/GB2008/002015, issued Dec. 17, 2009.

International Search Report for parent International Patent Application No. PCT/GB2008/002015, issued Sep. 12, 2008.

Fitzsimmons, Duncan, "Collapsible Wheel", I New Idea Homepage, http://www.inewidea.com/2008/02/04/4700.html (Feb. 4, 2008).

"Folding Wheels on a Collapsible Bicycle Concept", Craziest Gadgets Website, http://craziestgadgets.com/2009/10/07/folding-wheels-on-a-collapsible-bicycle-concept/ (Oct. 7, 2009).

* cited by examiner

SPOKED WHEEL

CROSS-REFERENCE TO RELATED APPLICATIONS

This application is the U.S. national stage application of International Application No. PCT/GB2008/002015, filed Jun. 12, 2008, which International application was published on Dec. 18, 2008, as International Publication No. WO 2008/152391 A1 in the English language, which application is incorporated herein by reference. The International application claims priority of European Patent Application No. 07252385.5, filed Jun. 13, 2007, which application is incorporated herein by reference.

TECHNICAL FIELD

The present invention relates to spoked wheels, especially for bicycles and wheelchairs in general and for collapsible wheelchairs or bicycles (that is to say bicycles that have a frame that can be changed from a configuration where the bicycle can be ridden to a more compact configuration for carrying or storage).

However, the present invention is not only limited to bicycles and wheelchairs but to any vehicle that includes or can include spoked wheels or to any application where a wheel is needed but it would be beneficial to be able to reduce the amount of space it occupies when not in use.

BACKGROUND ART

Folding bicycles and wheelchairs are well known and include a frame that will fold. However, the wheels used are a fixed size and the size of the wheels limits the size that the bicycle or wheelchair can be folded (the "package size").

Small wheels have certain disadvantages when the bicycle or wheelchair is being used. Small wheels have higher rolling resistance in contact with the road than larger wheels, meaning that the bicycle or wheelchair is harder to propel and so is slower. There is also more friction from the wheel bearing because a smaller wheel rotates faster for a given speed than a larger wheel. Furthermore, larger diameter wheels are more comfortable than smaller wheels as they can span small dips in the road or pavement, which smaller diameter wheels fall into. In the case of bicycles, smaller diameter wheels generate lower gyroscopic forces than larger wheels, making them less stable to ride. In addition, large wheels are needed on wheelchairs to enable the user to reach the circumferential push rims to propel the wheelchair along.

On the other hand bicycles and wheelchairs with large wheels cannot be folded into such small packages as those with smaller wheels, making them harder to store and more unwieldy to carry and transport.

A variety of folding bicycles are available commercially, having a variety of different wheel sizes to suit individual cyclist's priorities. However, it would be desirable to provide a folding bicycle with larger wheels that can be folded into a smaller-size package. Likewise, it would be desirable to provide a wheelchair with foldable wheels so it can more easily be carried around and fit in the boot (trunk) of a car. This is achieved, in accordance with the present invention, by providing wheels whose configuration and shape can be altered which gives bicycle and wheelchair designers flexibility to design different configurations of folding bicycles and wheelchairs that have large wheels.

U.S. Pat. No. 4,465,321 describes a portable collapsible spokeless wheel for rotation within a fender (mudguard). Rollers are distributed around the inner surface of the fender, which extends around over half of the circumference of the wheel. The wheel rotates on the rollers within the fender.

U.S. Pat. No. 4,602,823 describes a collapsible wheel having a rim made of flexibly jointed rim segments and spokes made of fabric material that can be tensioned.

FR-2795947 discloses a wheel for a wheelchair that can be used to climb small steps. The wheel has a rim supported on telescopic spokes, which are biased outwards by springs to maintain the rim in a circular shape in normal use. However, when the wheel encounters the edge of a step, the force due to the contact with the step telescopes some of the spokes, thereby allowing the wheelchair to mount the step. The rolling resistance of such an arrangement is very high and it would be difficult to propel such a wheelchair.

GB-573956 discloses a folding wheel having four wheel rim segments. The joint between adjacent rim segments are supported by spokes, at least three of which must have adjustable lengths; the length of one spoke is adjustable telescopically and the lengths of another two spokes are adjustable by including a folding joint part of the way along the lengths of the spokes. Such an arrangement is complex and heavy.

DISCLOSURE OF THE INVENTION

The present invention provides a spoked wheel and a vehicle including spoked wheels, as defined in the accompanying claims.

Thus, the present invention provides a collapsible wheel having a hub that rotates with a rim. The hub will, when fitted onto a vehicle, rotate around an axle that is connected to the hub via bearings, in a manner that is currently widely in use. In the present specification, the term "hub" is used to mean the central part of the wheel and is not intended to be limited to the axle or axis about which the wheel rotates, although obviously, such an axis will pass through the hub when in use; the hub may optionally include an axle. Furthermore, the term "hub" is not intended to require that bearings are present in the hub; although bearings will generally be present between the rotating wheel and the vehicle concerned, such bearings may form part of the vehicle rather than part of the wheel, as further discussed below.

The rim is composed of a series of circumferential sections that are joined together by hinges. The hinges allow the sections to pivot with respect to each other within the plane of the wheel so that the wheel can have a circular shape ("unfolded configuration") and a non-circular shape ("folded configuration"), which may generally be described as a "flattened" circle having a length longer than the diameter of the circular wheel and a width that is substantially narrower than the wheel diameter. In this specification, we will refer to a wheel in its circular configuration as "unfolded and in its condensed configuration as folded" and the act of changing the wheel configuration will be referred to as "folding" and "unfolding". The ability to fold the wheel allows it to be placed alongside an elongated member of a bicycle frame when the frame is folded and provides scope to make a new design of folding bicycle having, when folded, a package that is, overall, smaller (at least in one dimension) than the package size if the wheel had remained circular; also the folded configuration will be more manageable. Similar considerations also apply to wheelchairs.

In order to support the rim on the hub, a number of spokes are provided between the hub and the rim. Each spoke is connected at its end to the rim via a pivoting joint, which allows the change of shape described above.

Each spoke extends generally across the whole diameter of the wheel; diametric spokes provide a simpler mechanism, are simpler to operate and are stronger than spokes that extend only between the hub and the wheel rim.

When the wheel is moved into its folded configuration, the spokes will pivot with respect to each other in a sort of scissor action although, as will be seen from the later discussion, the axis about which the spokes pivot may move in the course of the folding (or unfolding). The folding movement will cause the spacing between certain ends of adjacent spokes to increase while other spacings will decrease. Where the spacing between a pair of adjacent spoke ends decreases on folding the wheel, the spoke ends may be attached to adjacent rim sections and where the spacing increases, then they may be attached to non-adjacent rim sections, that is to say one or more whole rim sections are located between them.

In order to simplify the design and minimise the weight of the wheel, the number of rim sections will generally be kept to a minimum. For the same reason, the number of spokes is preferably kept to a minimum and one embodiment provides a pair of spokes that extends diametrically across the wheel in an "X" configuration. In this case, the rim may comprise six sections, four of which are attached to the respective ends of the two spokes and two of which lie between the ends of the spokes where the spacing between the two ends increases when the wheel is folded. This additional section provides the increased length of the wheel in the non-circular folded configuration.

A lock may be provided to lock the spokes relative to each other, particularly in the unfolded circular wheel configuration. In addition, the rim sections and the spokes are tensioned against each other when the wheel is in the unfolded configuration, partly to ensure that the rim sections are forced to form a circular shape, even under the weight of the vehicle and its user, and partly to prevent the components of the wheel from rattling. The ends of the spokes and the rim sections may be so configured that, when in the circular unfolded configuration, the ends of the spokes bear against their adjacent rim sections and apply a radial force thereto.

The tyre used on the rim may be a so-called "tubular" or "tub" tyre, which is a pneumatically inflated inner tube that is wholly contained within an external tyre, that is to say the tyre extends underneath the inner tube between the rim and the inner tube. Alternatively, a tyre can extend only around the outside of a pneumatic tube. These arrangements are in contrast to the more usual type of bicycle tyre in which inner tube is located in an annular space between the wheel rim and the tyre. Either way, the tyre should not obstruct the folding or unfolding of the wheel. Such a tubular tyre can remain in place on the wheel rim in both the folded and the unfolded configurations and during the transition between them. Tubular tyres are well known, particularly on racing bicycles and are widely commercially available. Alternatively, a solid tyre may be used instead of a pneumatic tyre, or it is even possible to provide no tyre at all.

DESCRIPTION OF DRAWINGS

There will now be described, by way of example only, an embodiment of the wheel in accordance with the present invention with reference to the accompanying drawings in which.

DESCRIPTION OF THE BEST MODE FOR PUTTING THE INVENTION INTO OPERATION

The wheel of the present invention will initially be described in connection with a bicycle wheel but similar considerations apply to wheels for other vehicles, e.g. wheelchairs. A wheel for a wheelchair is specifically shown and described later in connection with FIG. 16.

Figure 1:
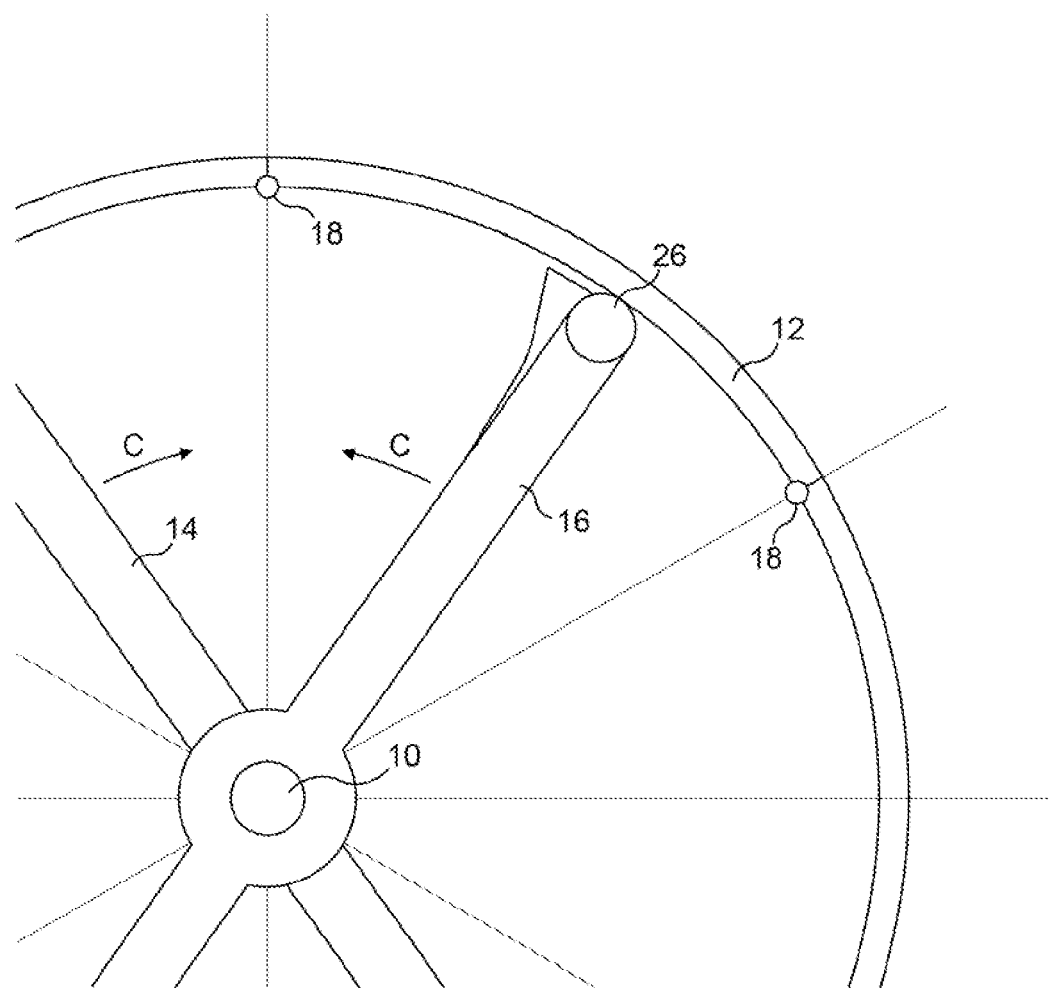
FIG. 1 is a schematic side view of part of a collapsible wheel in accordance with the present invention.
Figure 2:
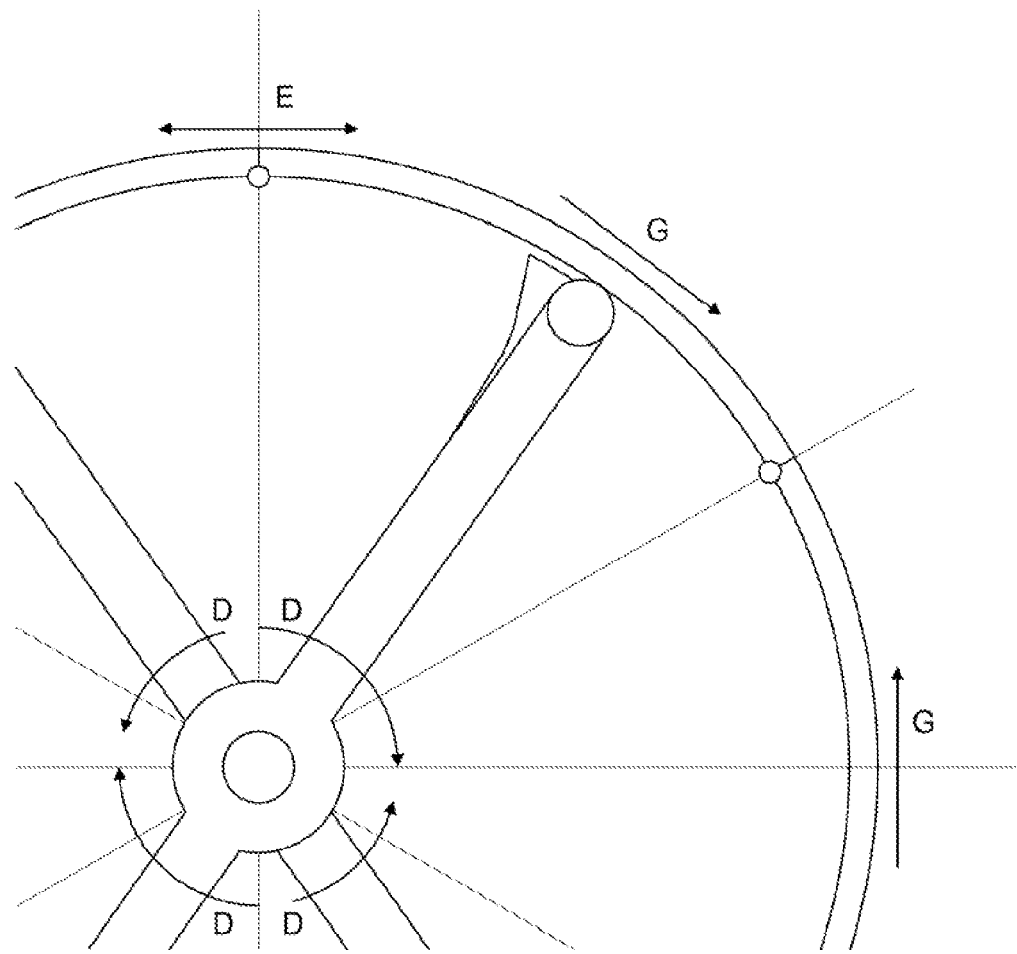
FIG. 2 is a schematic side view of part of the wheel of Figure just prior to it adopting an unfolded circular configuration.
Figure 3:
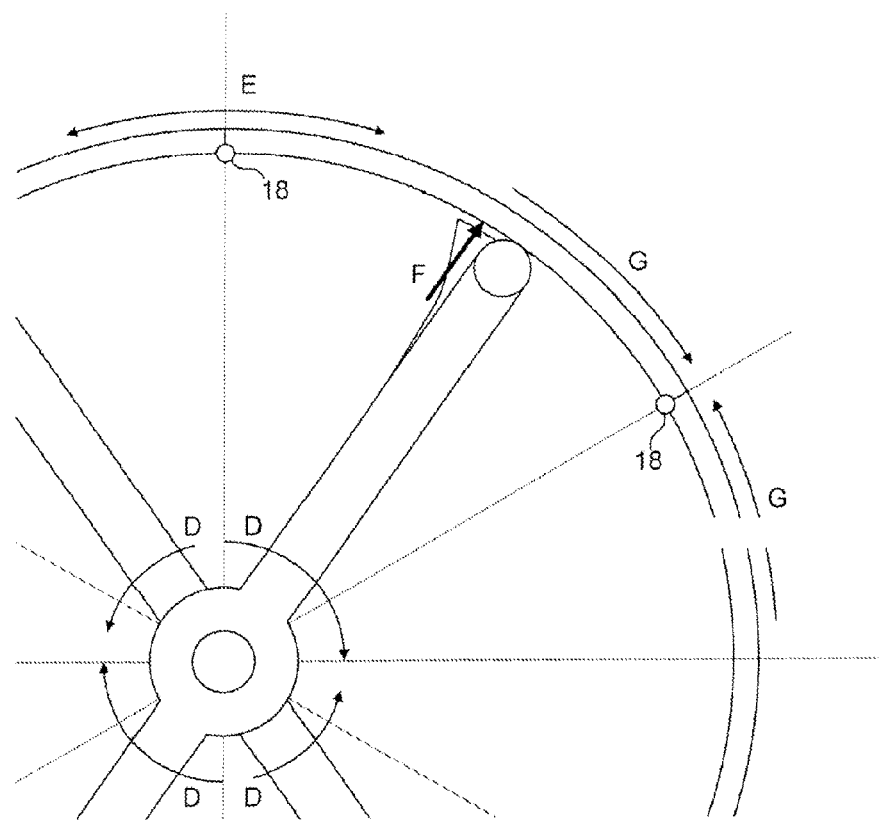
FIG. 3 is a schematic view of part of the wheel of FIGS. 1 and 2 in the unfolded circular configuration showing forces that are applied to the wheel.
Figure 4:
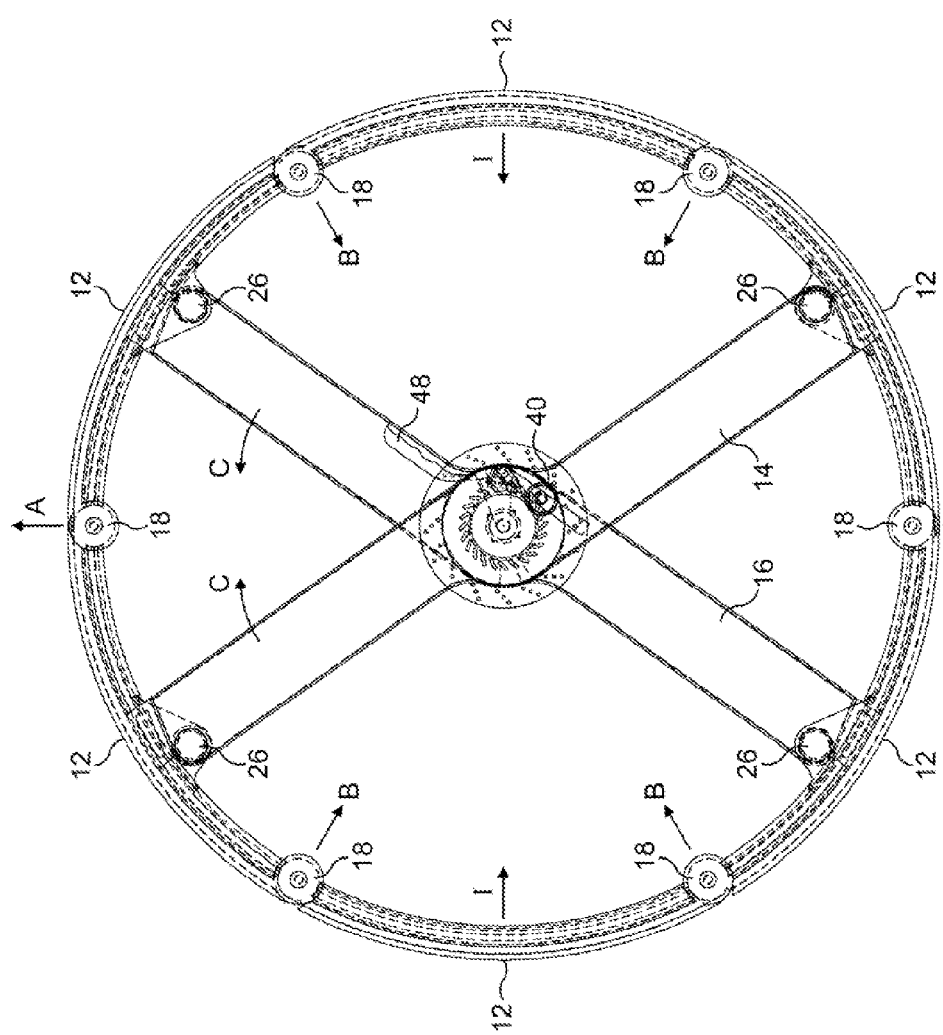
FIG. 4 is a side view of a wheel of the present invention in its unfolded circular configuration.

Referring initially to FIGS. 1 to 5, there is shown a bicycle wheel having a hub 10, a rim 12 and a pair of spokes 14, 16 that extend substantially along two diameters of the wheel. The rim 12 is made up of six sections of identical shape (only some of which are shown in FIGS. 1 to 3 but all six are shown in FIG. 4). Hinges 18 are provided between the sections, which allow the wheel to be moved into the folded configuration shown in FIG. 14 when the spokes 14, 16 are moved towards each other in the direction of the arrows C. This folding action causes two of the hinges 18 to move outwardly in the direction of arrows A (see FIG. 4) and four of the hinges to move inwardly in direction of arrows B (again see FIG. 4).

Figure 5:
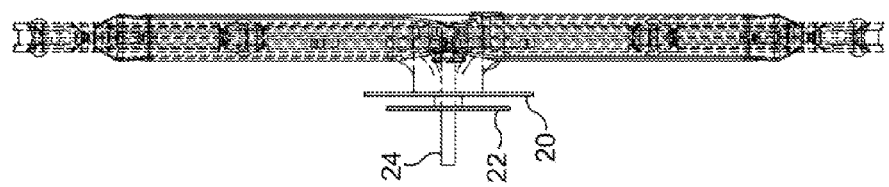
FIG. 5 is an end view of the wheel of FIG. 4.

FIGS. 4 and 5 show the axle 24 of rotation, including a rear drive sprocket 22 and a disc brake pad 20 mounted on the axle. As shown in FIG. 5, the axle only extends on one side of the wheel but will generally extend on both sides of the wheel, in practice. However, the bicycle could be redesigned in order to work with an axle extending only on one side. A wheelchair will generally only have an axle extending out of one side of the wheel. The spokes 14, 16 are connected at their respective ends to one of the rim sections 12 by way of pivots 26.

Figure 14:
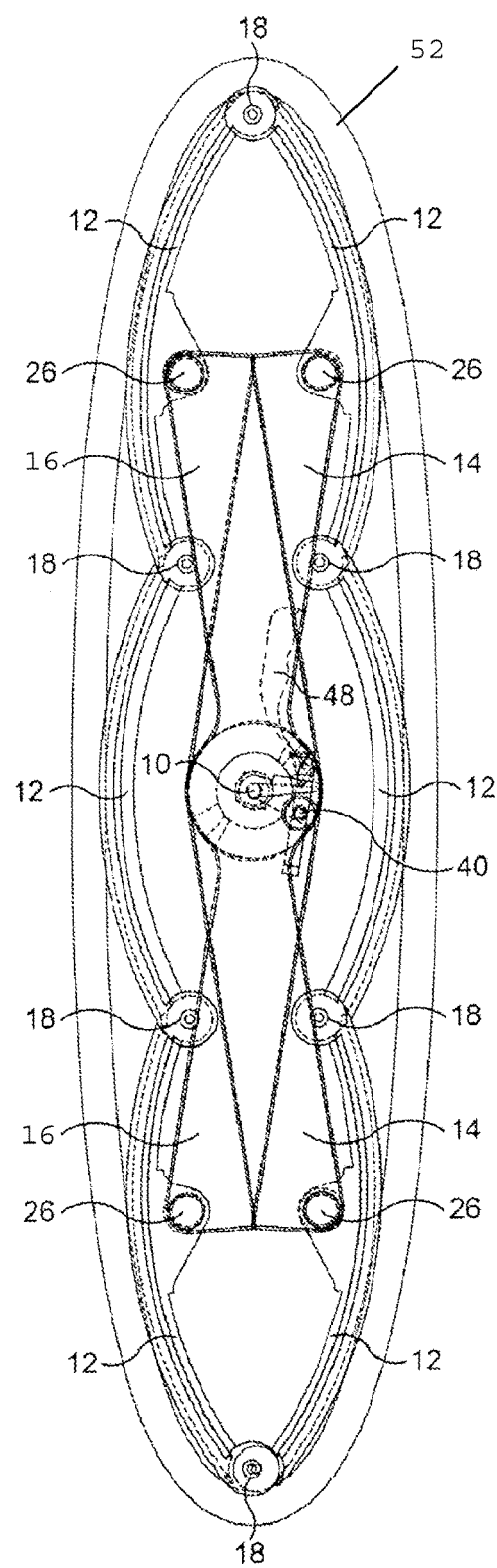
FIG. 14 is a view of the wheel in its circular, folded configurations.

In summary, it can be seen that the wheel can be moved between the circular configuration shown in FIG. 4 and the elongated folded configuration shown in FIG. 14 by moving the spokes 14, 16 together in the direction of arrows C. In order to bring the wheel back into its circular configuration, the spokes may be moved apart in the direction opposite to arrows C. However, in order to provide a robust wheel that is able to withstand the rigours of cycling, the spokes 14, 16 must be tensioned, e.g. by pressed against their respective rim sections 12 and the hinges 18 must be tensioned or compressed to prevent them from moving relative to each other while cycling. In short, all the parts must be clamped together.

This is achieved by rotating the spokes 14, 16 in the direction of arrow D shown in FIG. 2 when unfolding the wheel, as described below.

Figure 6:
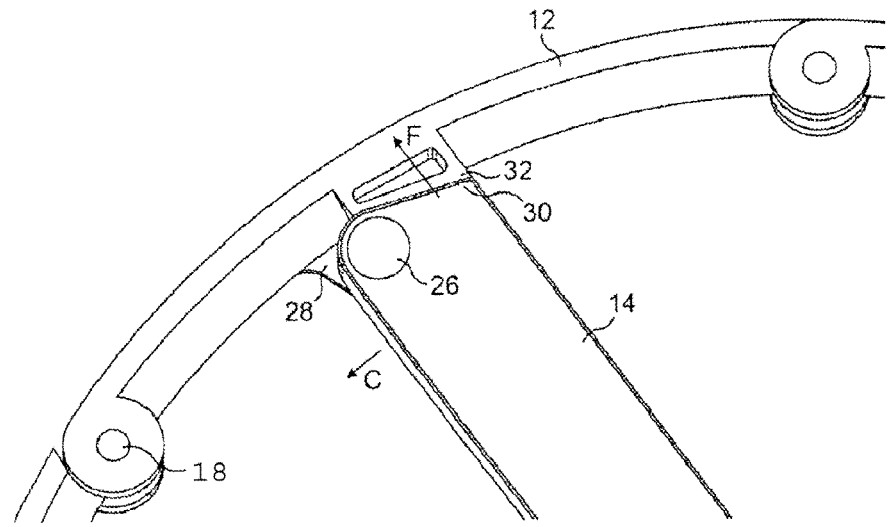
FIG. 6 a perspective side view of part of the wheel of FIGS. 4 and 5.

It should be noted that, in FIG. 2, the rim is not quite circular and the movement of the spokes in the direction of arrow D (together with force F) renders the rim circular, as shown in FIG. 3. The rotation of the spokes applies tension to the hinge at the top of the wheel (as seen in FIG. 2), which is indicated by double headed arrow E. At the same time, the rotation of the spokes in the direction of arrow D causes a radial force F to be applied to the rim at the end of the spokes. The application of this force is best understood by reference to FIGS. 4 and 6, where FIG. 6 shows the end of the spoke in the top left hand corner of the wheel of FIG. 4. As can be seen, a plate 28 is secured to the underside of the rim section 12 and the pivot pin 26 passes through the spoke 14 and through the plate 28. As the spoke is rotated in the direction of arrow D, the end 30 of the spoke 14 presses against an angled surface 32 on the underside of the rim section 12, thereby applying force F to the rim section 12. This force F together with the tension force E (see FIGS. 2 and 3) forces the rim section into a circular form, as shown in FIG. 3. In addition, it ensures that the ends of the spokes are clamped tight against the rim sections 12 that they are pivoted to. The force F exerted by the ends of the spokes on the surfaces 32 determines the trueness and circularity of the wheel. This force can be adjusted by providing the surface 32 on the end of an element (not shown) that is clamped in position. However, the position of the clamped element can be set by moving the element, prior to clamping, radially inwards and outwards to adjust force F applied.

Turning again to FIGS. 2 and 3, the pivoting of the spokes in the direction of the arrows D, in addition to providing tension forces E, also applies compression forces G to the hinge 18 in the upper right position shown in FIG. 3. In FIG. 4, these forces G keep the four hinges 18 on the left and the right hand side of the wheel (as seen in FIG. 4) in compression and clamp the rim sections 12 on either side of the hinges together so that they cannot move. In summary, the pivoting of the spokes in the direction of arrow D applies radial force F to the rim sections, circumferential tension to the hinges 18 at the top and the bottom of the wheel (as seen in FIG. 4) and applies compression forces G to the four hinges on the left and right hand side of the wheel shown in FIG. 4. Accordingly, all the moving parts are clamped together by force to form a rigid structure and so the parts cannot move relative to each other. Also, the rim sections 12 are maintained in a circular shape.

Figure 7:
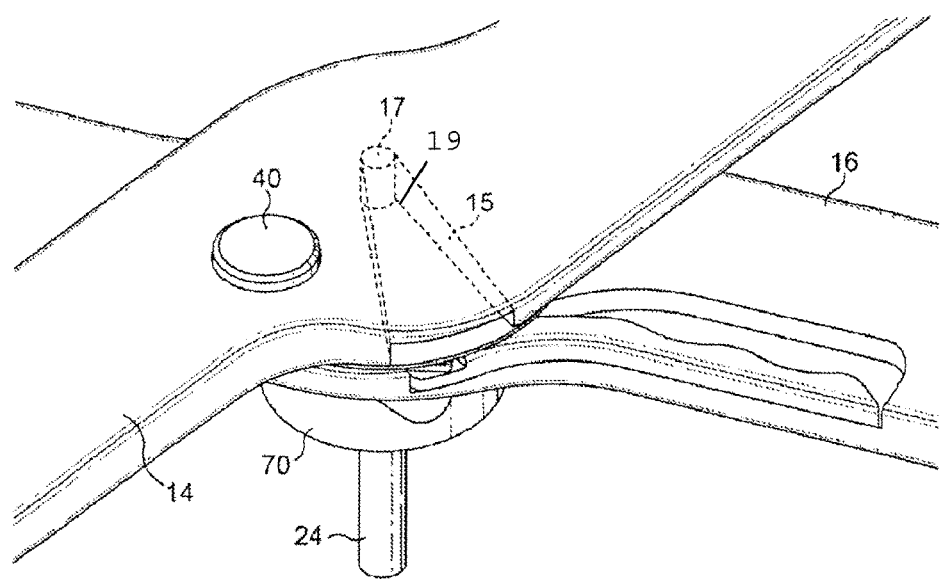
FIGS. 7 to 10 show a configuration for tightening and locking the wheel when in its unfolded circular configuration.
Figure 8:
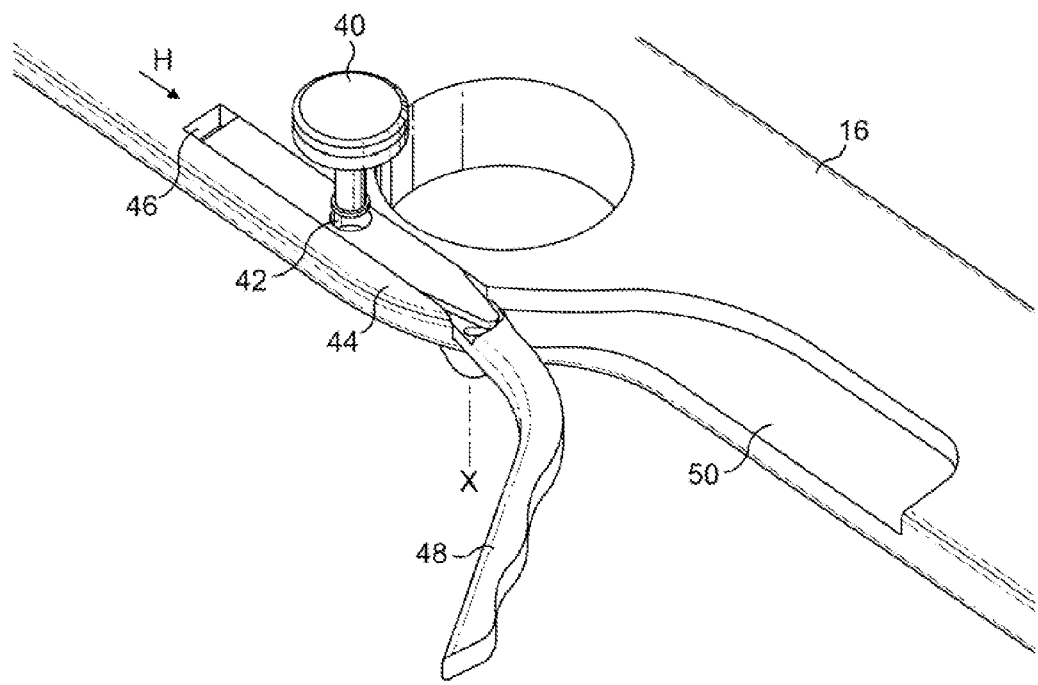
Figure 9:
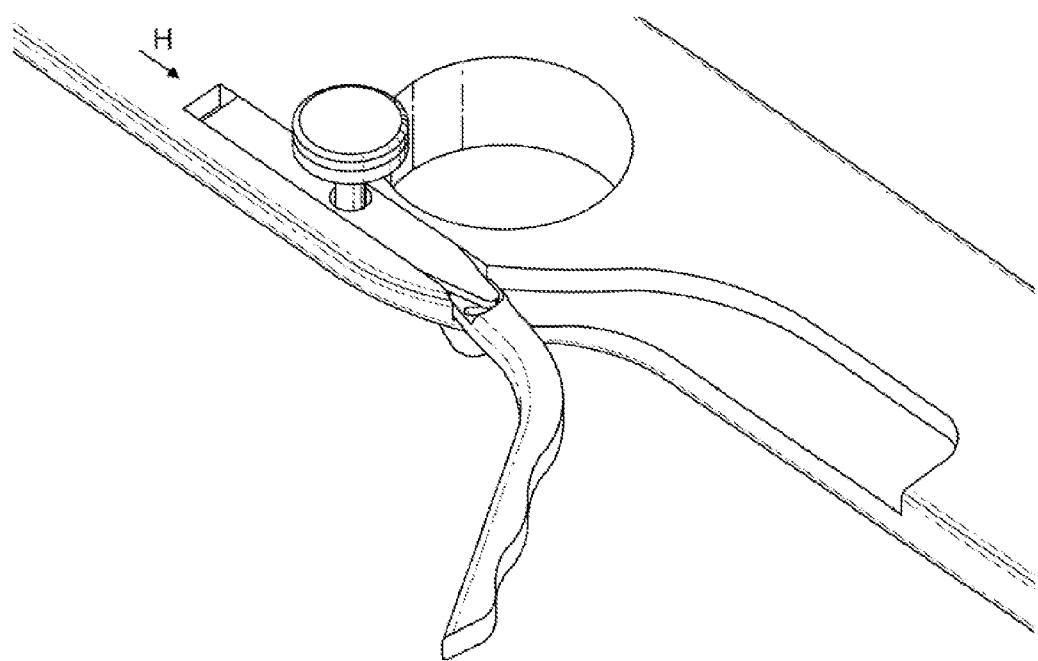
Figure 10:
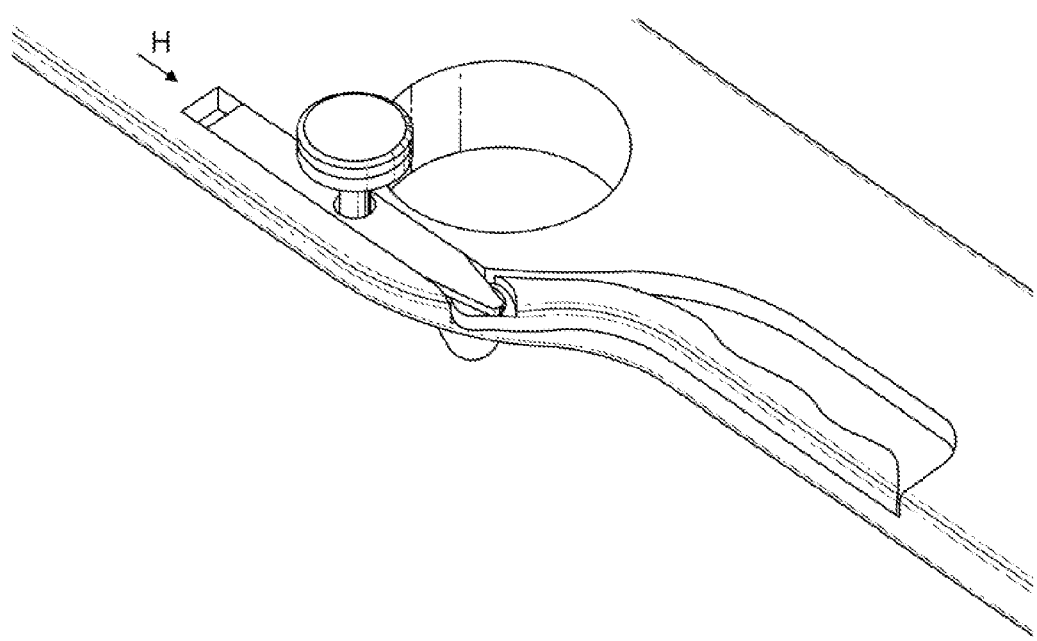
Figure 11:
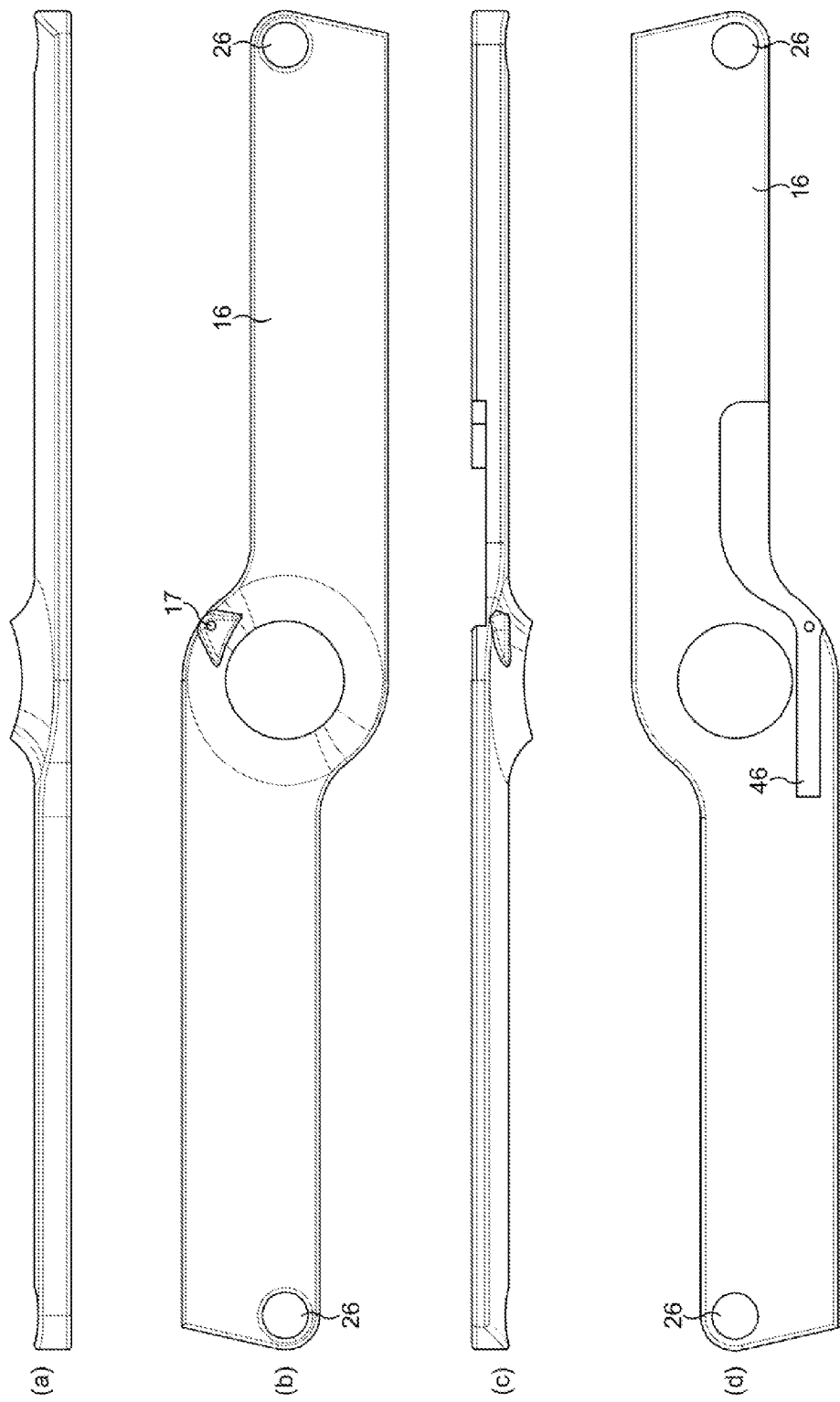
FIGS. 11(*a*) to (*d*) are, respectively, a side view, a top view, a second side view and a bottom view of a first spoke of the wheel of FIGS. 1 to 10.
Figure 12:
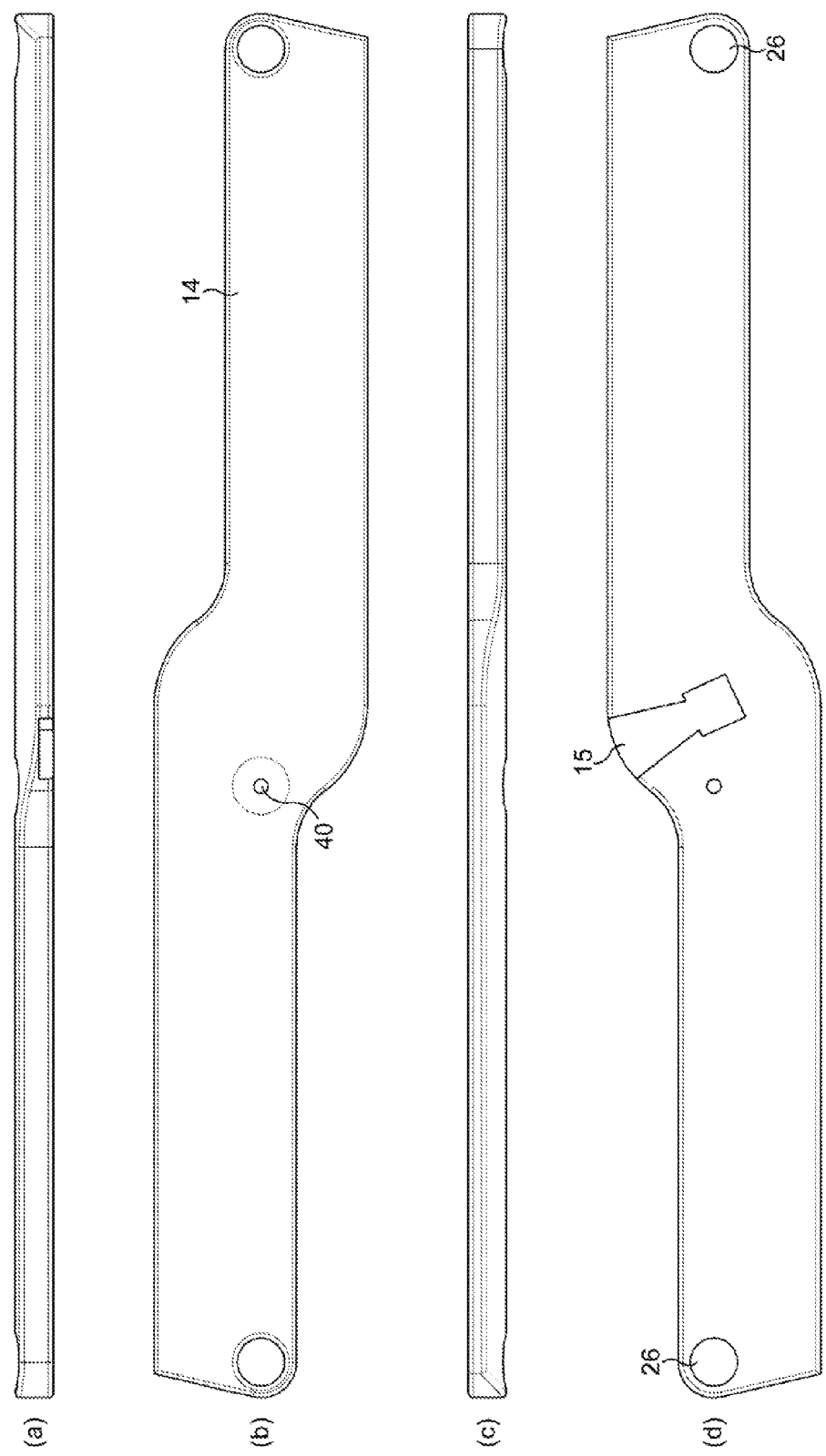
FIGS. 12(*a*) to (*d*) are a side view a top view, a second side view and a bottom view of a second spoke of the wheel of FIGS. 1 to 11.

In order to achieve the above effect, it is necessary to apply a substantial force to cause the spokes to pivot in the direction of arrow D and lock the wheel components in place under the above forces. This is achieved in accordance with the illustrated embodiment by the arrangement shown in FIGS. 7 to 10. Referring initially to FIG. 7, there can be seen the two spokes 14, 16 from the wheel of FIGS. 1-5. A pin 40 extends through spoke 14 and engages in a hole 42 in a slide 44 that can move along a groove 46 within the spoke 16 as will be described in connection with FIGS. 8-10. FIGS. 8 to 10 show the spoke 16 without spoke 14, which would usually overlie spoke 16.

In FIG. 8, the pin 40 is shown just above the hole 42 whereas in FIGS. 9 and 10 it has entered into the hole 42 in the slide 44. Attached to the end of the slide 44, is a handle 48 that can pivot about an axis shown by the dotted line "X" in FIG. 8. The pivoting of the handle 48 in an anti-clockwise direction (as seen) moves the slide 44 in the direction of arrow H, which causes the spokes 14, 16 to move in the direction of the arrows D (see FIGS. 2 and 3) to apply the tension and compression forces to the rim described above and also the radial force F. The pivoted handle 48, after having passed over top-dead-centre is accommodated within recess 50. Accordingly, the tension within the wheel and in the slide 48 tends to move the handle further into the recess 50 and so the arrangement is stable, if, for any reason, the above mechanism should fail, e.g. because the handle 48 breaks, the wheel will not collapse, but merely loose circularity, because the pin 40 will limit the movement of the spokes.

In order to fold the wheel to the FIG. 14 configuration, the above-described process is reversed. Firstly, the handle 48 is moved out of the recess, thereby relieving the tension in the slide 44 and allowing it to move in the direction opposite to arrow H. This in turn allows the pin 40 to be removed from the two spokes 14, 16, which thereby allows free movement between the spokes. By pressing the wheel in the direction of arrows I (see FIG. 4), the spokes 14, 16 will pivot towards each other in the direction of the arrows C and lie practically over each other, as shown in FIG. 14. In the folded configuration shown in FIG. 14, two of the hinges 18, which are the hinges shown at the top and bottom of FIG. 4, have been moved outwardly whereas the other hinges 18 have moved inwardly to form the folded shape shown. The movement of the spokes 14, 16 in the folding-up process will be partly dictated by the configuration of the rim sections 18. Therefore, the spokes 14, 16 may not be able simply to pivot about a fixed axis but rather may have to slide over each other as well.

Because of the sliding motion, a bearing cannot be fixed permanently to both spokes 14 and 16 and in fact it is spoke 16 that is fixed to a bearing 70 (see FIG. 7) and spoke 14 is secured to spoke 16; this can be seen in FIG. 7 which shows (in broken lines) a pin 17, which is part of spoke 16, and an inwardly tapering internal slot 15 which is provided in spoke 14. When the wheel is in the circular, unfolded configuration, the pin 17 is located at the end 19 of the slot, which is sized to locate the pin. However, when the wheel is being folded, the pin 17 can move within the slot and so accommodate the sliding and pivoting movements of the spokes. The tightening of the handle 50 ensures that the pin is properly seated in the location point at the end 19 of the slot 15 shown in FIG. 7 thereby locking the spokes together in the hub. When the wheel is tightened by closing the handle 48, the spoke 14 is rigidly connected to the spoke 16 by both the pin slot arrangement 15, 17 and by the arrangement of the handle/slide 44 and pin 40.

Other tensioning and locking mechanisms can be used instead of the one described.

FIG. 14 shows a tyre 52 on the wheel; the tyre is a tubular tyre and will remain in place on the rim during the folding and unfolding procedure while still at full inflation pressure.

Figure 15:
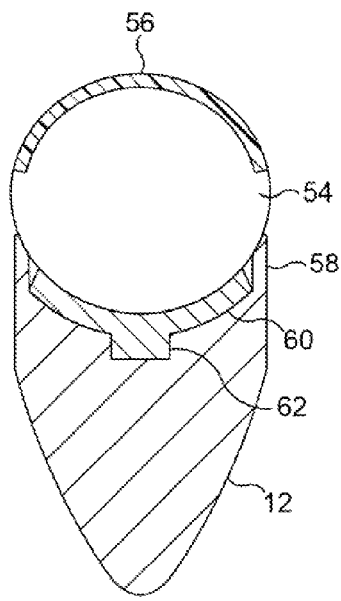
FIG. 15 is a section view through the rim of a tyre of the present invention, showing a tyre on the wheel.

FIG. 15 shows a cross section through the rim of the wheel when unfolded, which is an alternative to the arrangement depicted in FIG. 14. In the FIG. 15 arrangement, the pneumatic tyre is composed of a pneumatic tube 54 that includes a hard rubber section 56 that forms the part of the tyre that engages the ground. The tube 54 is held on the rim 12 by annular shoulders 58. The shoulders alone will hold the pneumatic tube 54 on the wheel when it is unfolded but not when it is folded. In order to retain the tube on the wheel in a folded condition, the tube 54 is adhered to a tape element 60. The tape element 60 has adhesive on its upper face, which holds the pneumatic tube 54 in place even when it is the folded state. The tape element 60 is prevented from sliding circumferentially around the wheel rim 12 by bosses 62 having a cylindrical shape that engage with corresponding cylindrical sockets in the wheel rim 12.

Figure 16:
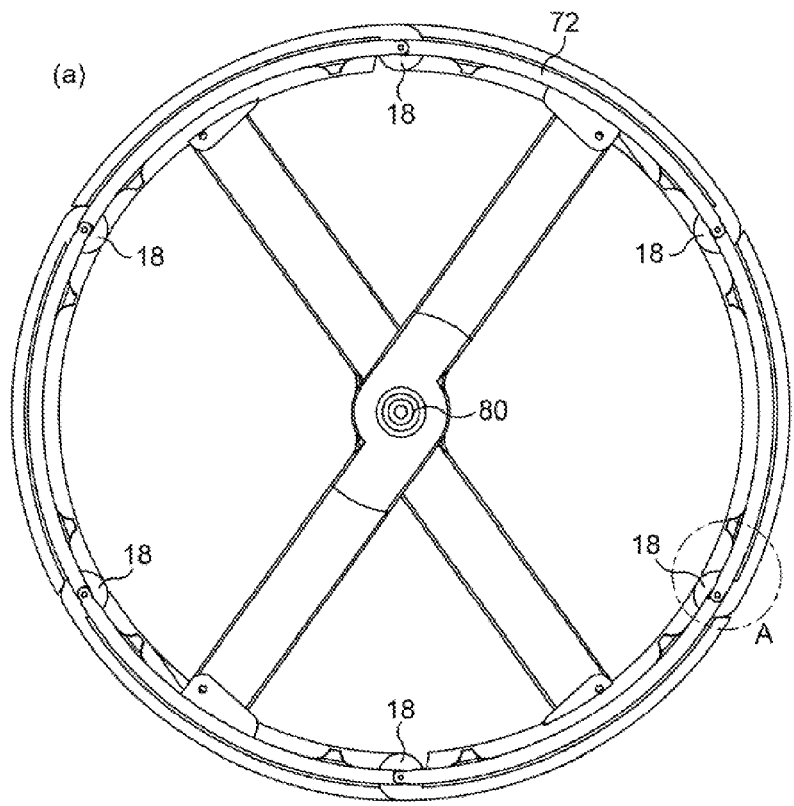
FIG. 16(*a*) to (*d*) are respectively a side view, and oblique view, a top view and a detail of a wheelchair wheel in accordance with the present invention.
Figure 16:
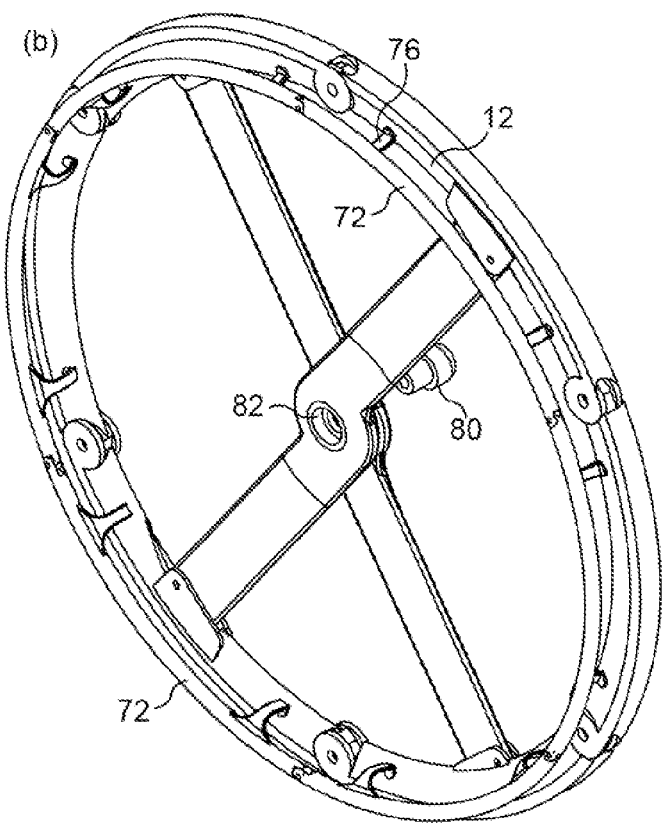
Figure 16:
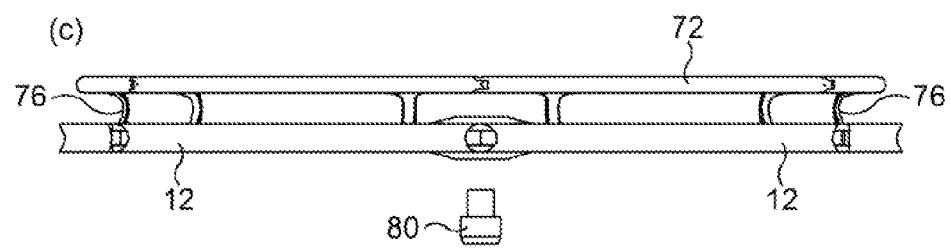
Figure 16:
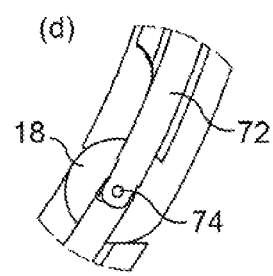

The wheel described above is a bicycle wheel but exactly the same configuration can be used for the wheel of a wheelchair, although the wheelchair has a push rim 72 attached to the rim sections 12 by means of bridges 76 (see FIGS. 16(*b*) and (*c*)). The push rim 72 is composed of six sections each of which lies alongside one of the rim sections 12 of the wheel.

The sections of the push rim 72 are pivoted together by a pivot pin 74 that lies on the same axis as the axis of the hinges 18 adjoining the rim sections 12 together. Therefore, as the wheel is moved from the folded to the unfolded position (and visa versa) the push rim 72 folds in exactly the same manner as the rim sections 12.

On a wheelchair, it is often desirable to remove the wheels when the wheelchair is being transported. This may be achieved by providing a bearing 80, which will generally be welded to the wheelchair frame, that fits into, and is locked into, an opening 82 in the hub region of the two spokes (the mechanism for locking the bearing 80 within the opening 82 is not shown).

As mentioned above, the configuration of the wheels requires the spokes to slide over each other when moving from the folded to the unfolded position or visa versa. The presence of the bearing 80 within the opening 82 therefore prevents the wheel from collapsing in use. However, it is also desirable to provide a tensioning arrangement using a pin 40 and a handle 48, which are not shown in FIG. 16, to provide a backup arrangement to prevent the wheel collapsing in use, as well as tensioning the wheel in its unfolded configuration.

Figure 13:
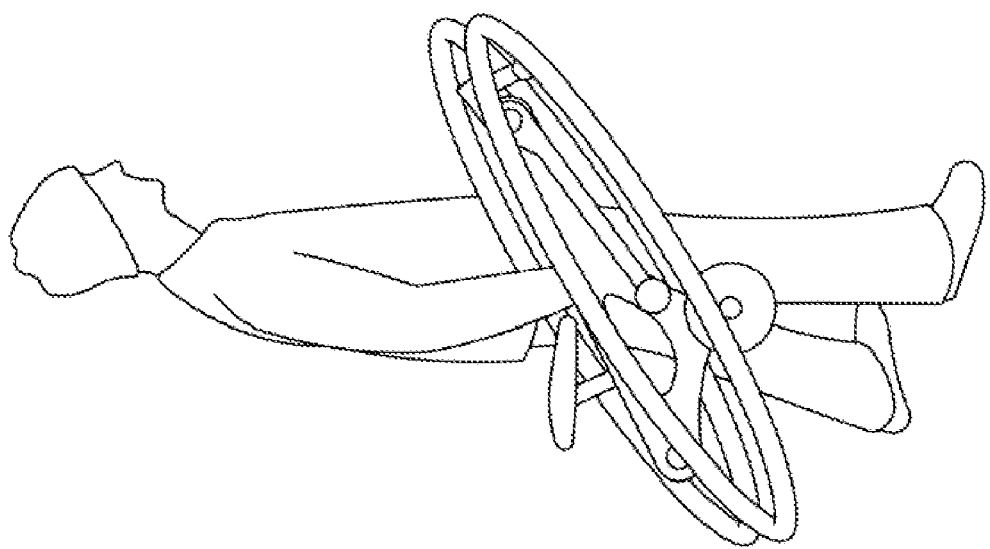
FIG. 13 is a schematic view of a folding bicycle including wheels of the present invention.
Figure 13:
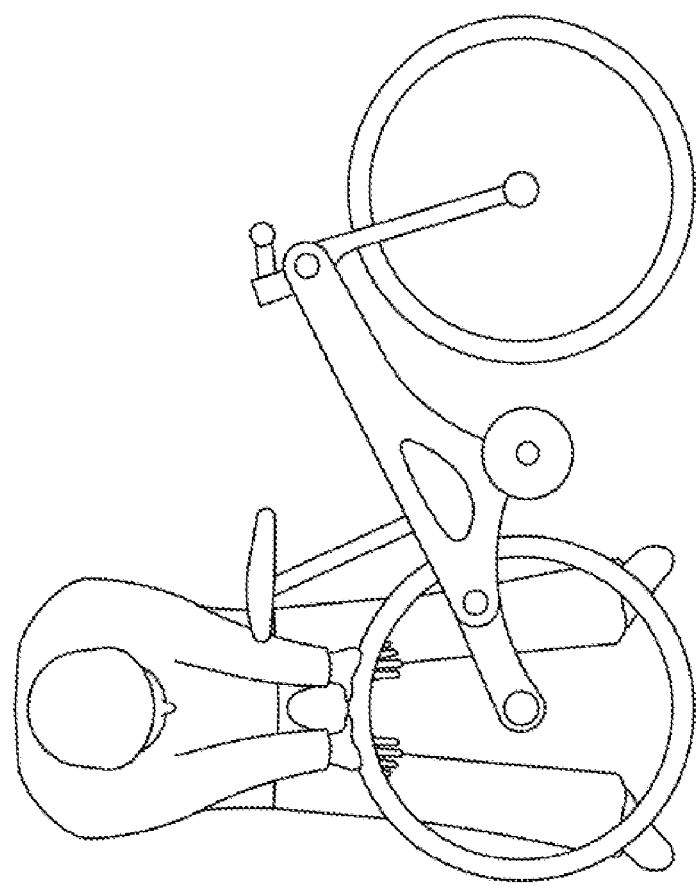

FIG. 13, is a sketch of one possible arrangement of a folding bicycle using the wheel described above.

What is claimed is:

1. A spoked wheel comprising:
   a rim comprising a continuous series of circumferential sections each of which has opposed ends and is connected at each of its ends to an adjacent section by means of a hinge that allows the two adjacent sections to pivot with respect to each other substantially in the plane of the wheel;
   a hub that rotates with the rim;
   a plurality of spokes extending between the hub and the rim and supporting the rim on the hub, each spoke extending diametrically across the rim and having opposed ends that are each pivotally attached to the rim;
   wherein at least one of the spokes is movable with respect to the hub in the plane of the wheel to change the angular spacing between adjacent spokes and alter the shape of the rim between a circular shape and a non-circular shape.

2. A wheel as claimed in claim 1, wherein each spoke is pivotally connected to a section of the rim at a location intermediate between the ends of the section.

3. A wheel as claimed in claim 1, wherein a pair of adjacent spoke ends that are movable towards each other when their respective spokes are moved about the hub to alter the shape of the rim from a circular shape to a non-circular shape are connected to adjacent sections of the rim.

4. A wheel as claimed in claim 1, wherein a pair of adjacent spoke ends that are movable away from each other when their respective spokes are moved about the hub to alter the shape of the rim from a circular shape to a non-circular shape are connected to sections of the rim that are separated from each other by at least one other section.

5. A wheel as claimed in claim 1, which includes two spokes, each of which extends diametrically across the rim and has opposed ends, each end being pivotally attached to the rim.

6. A wheel as claimed in claim 5, wherein the rim comprises six sections, four of which are attached to respective ends of the spokes and two of which lie between the spokes whose ends are movable away from each other when their respective spokes are pivoted about the hub to alter the shape of the rim from a circular shape to a non-circular.

7. A wheel as claimed in claim 1, which includes a tensioning mechanism that is capable of pivoting the spokes to clamp the wheel components against one another.

8. A wheel as claimed in claim 1, which includes a lock that, when locked, prevents the spokes from pivoting about the hub and prevents them from separating in linear translation.

9. A wheel as claimed in claim 1, wherein each spoke includes an opening in the region of the hub, the openings in the spokes being in register with each other when the rim has a circular configuration, so that a bearing can be introduced into the opening to provide a rotating bearing for the wheel.

10. A vehicle that includes a frame and at least one wheel as claimed in claim 1.

11. A vehicle as claimed in claim 10, wherein the wheel is mounted on a bearing attached to the frame and wherein the wheel can be demounted from the bearing.

12. A vehicle as claimed in claim 10, wherein the frame is foldable.

13. A vehicle as claimed in claim 10, which is a bicycle or a wheelchair.

14. A wheel as claimed in claim 1, which includes a tubular tyre held on the rim.

\* \* \* \* \*